(12) United States Patent
Bailey

(10) Patent No.: US 8,538,969 B2
(45) Date of Patent: Sep. 17, 2013

(54) DATA FORMAT FOR WEBSITE TRAFFIC STATISTICS

(75) Inventor: Michael Paul Bailey, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 401 days.

(21) Appl. No.: 11/274,560

(22) Filed: Nov. 14, 2005

(65) Prior Publication Data

US 2006/0277197 A1    Dec. 7, 2006

Related U.S. Application Data

(60) Provisional application No. 60/688,212, filed on Jun. 6, 2005, provisional application No. 60/687,633, filed on Jun. 3, 2005, provisional application No. 60/688,076, filed on Jun. 6, 2005.

(51) Int. Cl.
G06F 17/30 (2006.01)

(52) U.S. Cl.
USPC .... 707/742; 707/693; 707/758; 707/E17.002; 707/E17.083

(58) Field of Classification Search
None
See application file for complete search history.

(56) References Cited

U.S. PATENT DOCUMENTS

| | | | | |
|---|---|---|---|---|
| 5,359,729 A | * | 10/1994 | Yarnell et al. | 1/1 |
| 5,493,606 A | * | 2/1996 | Osder et al. | 379/88.05 |
| 5,604,854 A | * | 2/1997 | Glassey | 715/209 |
| 5,760,772 A | | 6/1998 | Austin | |
| 5,794,228 A | * | 8/1998 | French et al. | 707/2 |
| 5,796,402 A | | 8/1998 | Ellison-Taylor | |
| 5,821,931 A | | 10/1998 | Berquist et al. | |
| 5,832,479 A | * | 11/1998 | Berkowitz et al. | 707/3 |
| 5,835,087 A | | 11/1998 | Herz et al. | |
| 5,870,559 A | | 2/1999 | Leshem et al. | |
| 5,915,249 A | * | 6/1999 | Spencer | 707/742 |
| 5,966,139 A | | 10/1999 | Anupam et al. | |
| 6,008,809 A | | 12/1999 | Brooks | |
| 6,021,408 A | * | 2/2000 | Ledain et al. | 707/8 |
| 6,026,397 A | | 2/2000 | Sheppard | |
| 6,032,196 A | * | 2/2000 | Monier | 709/245 |
| 6,141,656 A | * | 10/2000 | Ozbutun et al. | 707/3 |
| 6,182,097 B1 | | 1/2001 | Hansen et al. | |
| 6,188,405 B1 | | 2/2001 | Czerwinski et al. | |
| 6,266,649 B1 | | 7/2001 | Linden et al. | |

(Continued)

FOREIGN PATENT DOCUMENTS

WO    WO 00/58866 A    10/2000
WO    WO 02/23438 A2    3/2002

OTHER PUBLICATIONS

U.S. Appl. No. 10/113,808, filed Mar. 29, 2002, Wiles Jr.
U.S. Appl. No. 10/113,322, filed Mar. 29, 2002, Zhao et al.

(Continued)

*Primary Examiner* — Fred I Ehichioya
*Assistant Examiner* — Michelle Owyang
(74) *Attorney, Agent, or Firm* — Kilpatrick Townsend & Stockton LLP

(57) ABSTRACT

A data format is optimized for storing data such as website traffic data. The data format enables easy access to and filtering of data, for example in generating website traffic reports. The data format also provides significant data compression. A method for generating a data file according to the data format employs linear compression and indexing to efficiently store the data. Data stored according to the format can be easily retrieved, particularly when a known value is specified and particular entries matching the known value are sought.

39 Claims, 7 Drawing Sheets

(56) References Cited

U.S. PATENT DOCUMENTS

| | | | |
|---|---|---|---|
| 6,310,631 B1 | 10/2001 | Cecco et al. | |
| 6,317,738 B1* | 11/2001 | Lohman et al. | 1/1 |
| 6,393,149 B2* | 5/2002 | Friederich et al. | 382/173 |
| 6,393,479 B1 | 5/2002 | Glommen et al. | |
| 6,414,677 B1 | 7/2002 | Robertson et al. | |
| 6,473,102 B1 | 10/2002 | Rodden et al. | |
| 6,489,968 B1 | 12/2002 | Ortega et al. | |
| 6,513,041 B2* | 1/2003 | Tarin | 707/10 |
| 6,523,040 B1* | 2/2003 | Lo et al. | 1/1 |
| 6,529,906 B1* | 3/2003 | Chan | 1/1 |
| 6,598,051 B1* | 7/2003 | Wiener et al. | 707/100 |
| 6,654,036 B1 | 11/2003 | Jones | |
| 6,671,711 B1 | 12/2003 | Pirolli et al. | |
| 6,704,016 B1 | 3/2004 | Oliver et al. | |
| 6,754,873 B1 | 6/2004 | Law et al. | |
| 6,766,370 B2 | 7/2004 | Glommen et al. | |
| 6,789,115 B1* | 9/2004 | Singer et al. | 709/224 |
| 6,850,988 B1 | 2/2005 | Reed | |
| 6,862,574 B1 | 3/2005 | Srikant et al. | |
| 6,941,312 B1* | 9/2005 | Hoffman et al. | 707/101 |
| 6,950,993 B2 | 9/2005 | Breinberg | |
| 6,963,874 B2 | 11/2005 | Kasriel et al. | |
| 6,968,511 B1 | 11/2005 | Robertson et al. | |
| 6,980,962 B1 | 12/2005 | Arganbright et al. | |
| 6,980,976 B2* | 12/2005 | Alpha et al. | 1/1 |
| 7,117,218 B2* | 10/2006 | Tkachuk et al. | 707/700 |
| 7,143,088 B2* | 11/2006 | Green et al. | 707/3 |
| 7,487,141 B1* | 2/2009 | Stephan | 1/1 |
| 7,630,996 B1* | 12/2009 | Hershkovich et al. | 707/101 |
| 2002/0010702 A1* | 1/2002 | Ajtai et al. | 707/101 |
| 2002/0040395 A1 | 4/2002 | Davis et al. | |
| 2002/0042750 A1 | 4/2002 | Morrison | |
| 2002/0063641 A1* | 5/2002 | Fish | 341/87 |
| 2002/0087621 A1 | 7/2002 | Hendriks | |
| 2002/0091591 A1 | 7/2002 | Tsumura et al. | |
| 2002/0093529 A1 | 7/2002 | Daoud et al. | |
| 2002/0099812 A1 | 7/2002 | Davis et al. | |
| 2002/0138509 A1* | 9/2002 | Burrows et al. | 707/501.1 |
| 2002/0152284 A1 | 10/2002 | Cambray et al. | |
| 2002/0165936 A1 | 11/2002 | Alston et al. | |
| 2002/0178169 A1* | 11/2002 | Nair et al. | 707/100 |
| 2002/0186237 A1 | 12/2002 | Bradley et al. | |
| 2002/0186253 A1 | 12/2002 | Rodden et al. | |
| 2002/0198939 A1 | 12/2002 | Lee et al. | |
| 2003/0023712 A1 | 1/2003 | Zhao et al. | |
| 2003/0025737 A1 | 2/2003 | Breinberg | |
| 2003/0028509 A1* | 2/2003 | Sah et al. | 707/1 |
| 2003/0055883 A1 | 3/2003 | Wiles, Jr. | |
| 2003/0115333 A1* | 6/2003 | Cohen et al. | 709/227 |
| 2003/0128231 A1 | 7/2003 | Kasriel et al. | |
| 2003/0131097 A1 | 7/2003 | Kasriel et al. | |
| 2004/0049417 A1 | 3/2004 | Nickerson et al. | |
| 2004/0133671 A1* | 7/2004 | Taniguchi | 709/224 |
| 2004/0139090 A1* | 7/2004 | Yeh | 707/100 |
| 2004/0205044 A1* | 10/2004 | Su et al. | 707/2 |
| 2004/0205157 A1 | 10/2004 | Bibelnieks et al. | |
| 2004/0243618 A1* | 12/2004 | Malaney et al. | 707/102 |
| 2005/0044508 A1 | 2/2005 | Stockton | |
| 2005/0071465 A1* | 3/2005 | Zeng et al. | 709/224 |
| 2005/0204307 A1 | 9/2005 | Nadal | |
| 2005/0216421 A1* | 9/2005 | Barry et al. | 705/64 |
| 2005/0229110 A1 | 10/2005 | Gegner et al. | |
| 2005/0235222 A1 | 10/2005 | Barbanson et al. | |
| 2005/0273727 A1 | 12/2005 | Barbanson et al. | |
| 2006/0048045 A1* | 3/2006 | Lehenbauer et al. | 715/509 |

OTHER PUBLICATIONS

U.S. Appl. No. 10/057,513, filed Jan. 25, 2002, Alston et al.
U.S. Appl. No. 09/835,112, filed Apr. 13, 2001, Cambray et al.
Hong, J. et al., "What Did They Do? Understanding Clickstreams with the WebQuitt Visualization System," WebQuilt homepage http://guir.berkeley.edu/projects/webquilt/, pp. 1-7.
Hong, J. et al., "WebQuilt: A Framework for Capturing and Visualizing the Web Experience," WebQuilt, homepage: http://guir.berkeley.edu/projects/webquilt/, May 1-5, 2001, pp. 1-8.
Notification of International Search Report and Written Opinion, PCT/US04/39253, Dec. 13, 2005, 13 pages.
Notification of International Search Report and Written Opinion, PCT/US04/06898, Feb. 9, 2005, 8 pages.
Notification of International Search Report and Written Opinion, PCT/US04/06696, Feb. 28, 2005, 9 pages.
Supplementary European Search Report, EP 04717485, Nov. 7, 2006, 3 pages.

* cited by examiner

DATA FORMAT FOR WEBSITE TRAFFIC STATISTICS

CROSS-REFERENCE TO RELATED APPLICATIONS

The present application claims priority from U.S. Provisional patent application Ser. No. 60/688,212, entitled "Data Format for Site Visitation Statistics," filed Jun. 6, 2005, the disclosure of which is incorporated herein by reference.

The present application further claims priority from U.S. Provisional patent application Ser. No. 60/687,633, entitled "Sampling Technique for Web Usage Analysis," filed Jun. 3, 2005, the disclosure of which is incorporated herein by reference.

The present application further claims priority from U.S. Provisional patent application Ser. No. 60/688,076, entitled "Website Traffic Analysis Engine and User Interface", filed Jun. 6, 2005, the disclosure of which is incorporated herein by reference.

FIELD OF THE INVENTION

The present invention relates generally to storage of website traffic data, and more particularly to a data format for storage of such data.

BACKGROUND OF THE INVENTION

Web analytics refers to the analysis of data associated with website traffic. For instance, web analytics can be used to mine visitor traffic data. A variety of visitor traffic data is measured such as what browser is being used, what links on a given web page were selected, whether a product was purchased, and the like. There are number of web analytics tools presently available such as Site Catalyst version 11 from Omniture of Orem, Utah. These tools are able to capture data on website usage, and responsive to a user's request display a variety of different metrics on website usage such fallout/conversion, A/B testing, and the like.

Typically, such web analytics tools generate website traffic reports that are useful to website administrators and other individuals who wish to determine how many visitors a site is attracting, as well as the characteristics and behavior of those individuals.

In order to provide accurate statistical reporting on website traffic by a large number of visitors, sampling techniques are usually applied. A processing module monitors visits to a website, for example by consulting server logs, and performs a sampling operation to discard some of the website traffic data while retaining a representative sample. This representative sample is then used in constructing reports to be presented to a user such as a website administrator.

Raw data and/or sampled data describing website traffic are typically stored in a database or other data store that is accessible to a web analytics report generation system. Often, the amount of data to be stored is relatively large.

Existing techniques for data compression can be applied in order to reduce the size of the stored data. However, such techniques are usually not optimized to storage of website traffic data, and therefore do not take advantage of particular characteristics of such data. Accordingly, existing techniques are not optimally effective in compressing website traffic data.

Furthermore, when generating reports it is often useful to be able to filter and/or sort data by reference to values, so as to present meaningful statistics as to website traffic patterns.

What is needed, therefore, is a data compression technique that takes advantage of particular characteristics of website traffic data and thereby provides improved compression results. What is further needed is a data format for storage of website traffic data that facilitates a high degree of compression for such data. What is further needed is a data format that yields greater efficiency when filtering, sorting, and or extracting selected data by reference to values.

SUMMARY OF THE INVENTION

The present invention includes a data format for storage of website traffic data, such as for later retrieval, analysis, and reporting in connection with web analytics functionality. In one embodiment, the present invention is implemented in a system for storing website traffic statistics in connection with an application for storing, analyzing, and reporting on website traffic.

A header specifies a number of tables to be included, table definition block size, and sampling modulus. A table definition block specifies fields to be included in each of a number of tables, and indicates locations within tables where information for each of a number of fields can be found. Tables store information for any of visitors, visits, hits, and commerce.

The present invention also includes a method for compressing website traffic data in accordance with the data format. According to the method and data format described herein, incoming raw data is listed by field and value and sorted. Data rows containing each value are identified. Linear compression and offsetting are applied to the identified data rows so as to compress the data and to facilitate retrieval by value query. In this manner, the present invention provides efficient storage and retrieval of data, particularly optimized for data such as website traffic data. Since data is stored by value, the present invention provides improved efficiency when sorting and/or filtering data by reference to field values.

BRIEF DESCRIPTION OF THE DRAWINGS

The accompanying drawings illustrate several embodiments of the invention and, together with the description, serve to explain the principles of the invention.

One skilled in the art will recognize that these Figures are merely examples of the operation of the invention according to one embodiment, and that other architectures and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather, these embodiments are provided so that this disclosure will be complete and will fully convey the invention to those skilled in the art.

In particular, in the following description the invention is set forth with respect to storage of website traffic data. However, one skilled in the art will recognize that the techniques described herein can be employed in the context of storage of other types of information as well. Accordingly, the particular context used herein for describing the invention is intended to be illustrative only, and is not intended to limit the scope of the invention in any way.

Architecture

Figure 1:
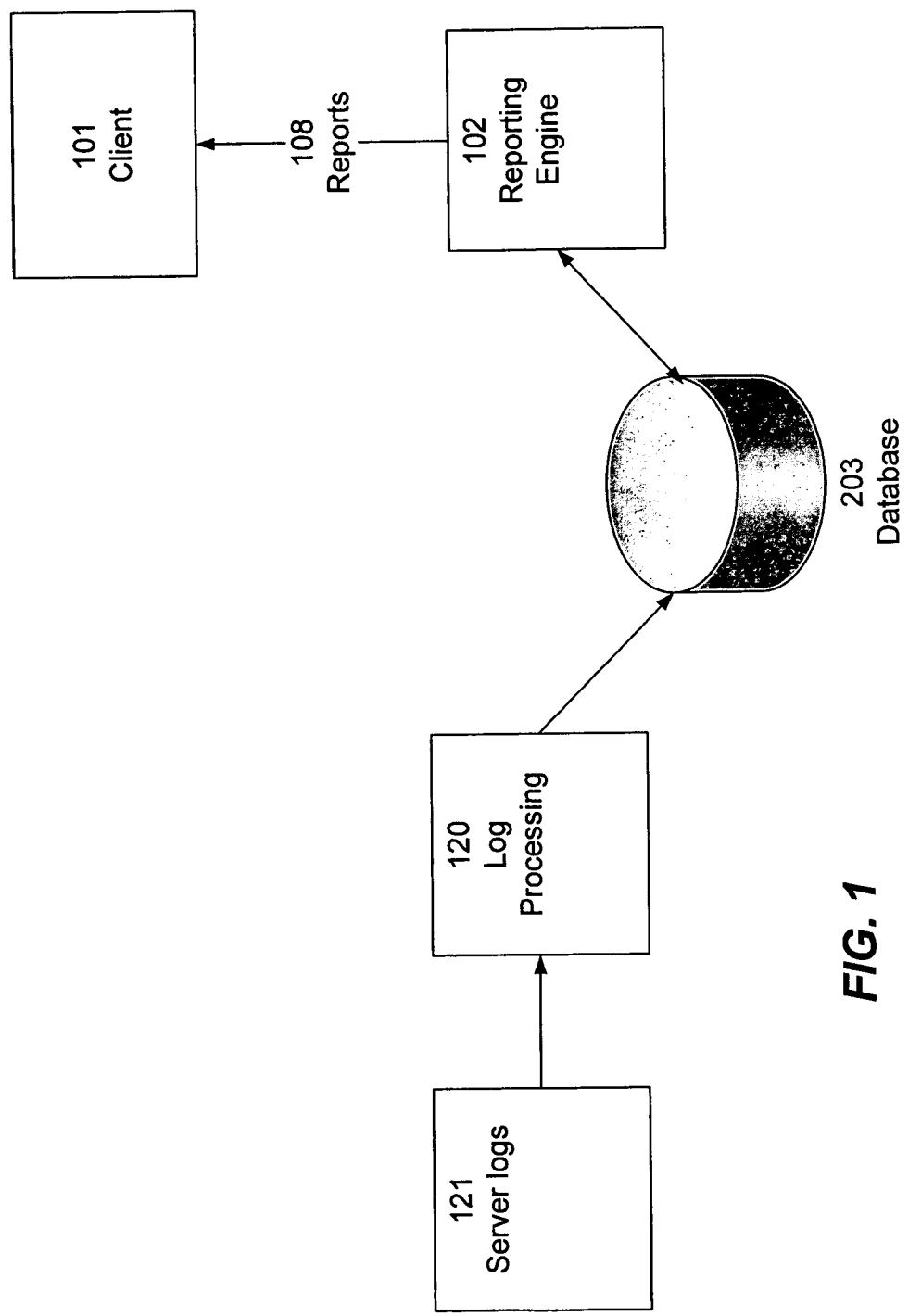
FIG. 1 is a block diagram depicting an example of an architecture for practicing the present invention according to one embodiment.

Referring now to FIG. 1, there is shown an example of an architecture for practicing the present invention. Server logs 121 contain raw data describing web traffic, as is recorded by web servers. Log processing module 120 is a software component that samples data from server logs 121 and stores sampled data 502 in a storage area such as database 203 for retrieval by a reporting engine 102. In one embodiment, log processing module 120 is implemented as part of a traffic analysis server or other component specifically designed for web traffic analysis. In another embodiment, log processing module 120 is implemented as part of a web server or other hardware or software component, or it can be implemented as a software module running on a conventional personal computer that is being used for web traffic analysis. Log processing module 120 can perform sampling operations in real time (as data is recorded at server logs 121 and relayed to log processing module 120), or in a batch methodology, or upon demand when a request is made for web traffic data.

In one embodiment, log processing module 120 samples data.

Reporting engine 102 is a centralized network for handling and responding to client requests for data on website usage. Although described herein as a network, this component can also be implemented as a software module running on a server or conventional personal computer. One skilled in the art will recognize that the functionality performed by reporting engine 102 as described herein can be performed by a stand-alone component or by an integrated component that is part of a client machine, server, or the like. In one embodiment, reporting engine 102 forms part of network 592 described in more detail in connection with FIG. 5.

Responsive to client requests, reporting engine 102 generates website traffic reports 108 based on sampled data 502 from database 203, and sends reports 108 to client 101 for display to a user. Alternatively, log processing module 120 can send sampled data 502 directly to reporting engine 102. Examples of website traffic reports 108 that can be so generated are described, for example, in related patent application Ser. No. 10/609,808, for "Capturing and Presenting Site Visitation Path Data", filed Jun. 27, 2003, the disclosure of which is incorporated herein by reference.

The data format of the present invention can be used, for example, for storing sampled and/or unsampled ("raw") data in database 203. The data format provides an efficient storage format that allows for quick retrieval of information for analysis and report generation purposes.

Data Format

Figure 2:
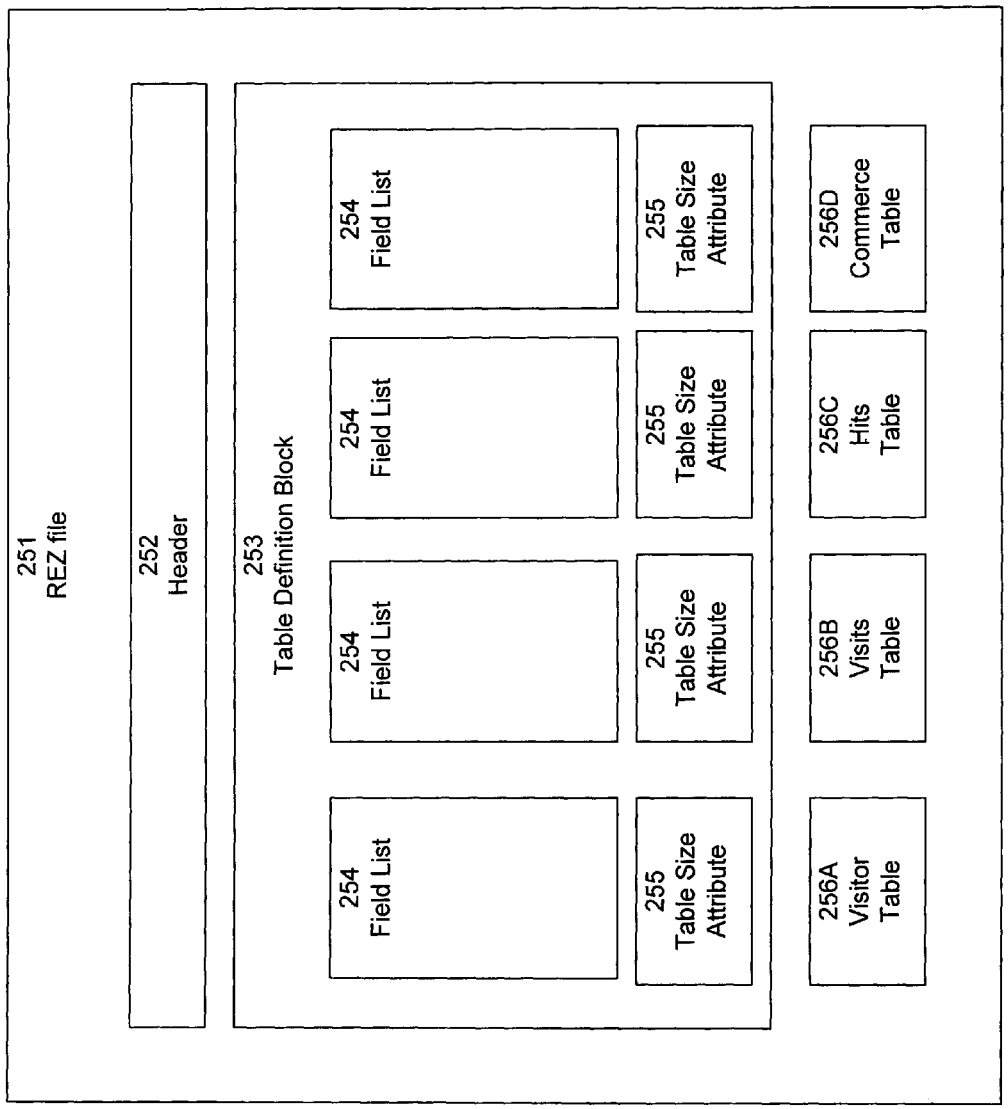
FIG. 2 depicts an example of a data format for a REZ file according to one embodiment.

In one embodiment, website traffic data is stored in a file referred to as a REZ file. Referring now to FIG. 2, there is shown an example of a data format for REZ file 251 according to one embodiment. REZ file 251 begins with header 252, which specifies basic information about the data contained therein. In one embodiment, header 252 contains three integers:
- the number of tables (four, for example);
- the size of the table definition block; and
- the modulus that was applied to get the sampling contained in the file, for embodiments that store sampled data as generated, for example, using techniques described in above-referenced related patent applications.

Table definition block 253 follows. In one embodiment, four tables 256 are defined in table definition block 253—one for each of the following tables 256A-D: visitors, visits, hits, and commerce. Each table 256 contains a number of fields such as pagename, revenue, date, and the like. An example of the type of data stored in each table 256 is as follows:

Visitor Table 256A
Visitor ID
Original referrer
Initial start date
Visits Table 256B (includes items that persist within a visit)
Browser
OS
Monitor resolution
Geographic location
Hits Table (or Page Views Table) 256C (includes items that change each page)
Page name
Properties (custom variables)
Commerce Table 256D
Products
Orders
Revenue Table definition block 253 consists of a field list 254 for each table. Each field list 254 provides an address in REZ file 251 where the information concerning the corresponding field can be found. In one embodiment, field list 254 is stored alphabetically so that a binary-search tree can be used to quickly find the desired field. In one embodiment, table definition block 253 also carries a table size attribute 255 for each table 256, which is the number of rows contained in the table 256.

From table definition block 253 and field list 254, the location of any given field can be determined. A field is stored as a list of 32-bit keys in ascending order followed by a ROWINDEX. A ROWINDEX is a structure that contains a variable-length array of increasing integers. This ROWINDEX refers to all of the rows in the table 256 with the given key for the field.

METHOD AND EXAMPLE

For illustrative purposes, the data format and compression technique described herein is set forth in terms of applicability to 32-bit integers. However, one skilled in the art will recognize that the present invention can be applied to other types of values and variables as well, without departing from the essential characteristics of the invention.

According to one embodiment of the present invention, the data format represents a series of values in terms of offsets. Each value (except the first) is specified as an offset from a previous value. Common patterns, such as consecutive integers, are specified as a start value and length.

For illustrative purposes, the series described herein include consecutive integers. However, other patterns can also be identified as series. For example, the system of the present invention could detect a series of values having a step value of 2, and could store the series in terms of the start value and length of the series. Alternatively, the system could detect a series of values having successively increasing step values (+2, +3, +4, etc.) and store that series in terms of start value and length. In one embodiment where several different types of series can be detected, the data format of the present invention could include a flag or other indicator to specify which of the plurality of series types applies (for example, a flag value of 1 could indicate a step value of 1, a flag value of 2 could indicate a step value of 2, and a flag value of 43 could indicate successively increasing step values starting with 3).

In one embodiment, the data format of the present invention also provides a specifier that indicates that a block of values should be skipped. These skips are not considered offsets. They do not point at the next integer in the sequence. Instead, they inform the decoding algorithm to skip a block of integers. Any number of skips can be combined together, allowing for any sequence of increasing integers to be compressed regardless of the constituent offsets.

When decoding data compressed according to the techniques described herein, the beginning of each offset or pattern marker is identified by some bit identifier based upon the specific implementation (i.e. 32-bit or 64-bit integers). This bit identifier specifies how many bytes are used for this specific offset or pattern marker. This bit identifier need not be of a fixed width. In one implementation, the bit identifier is the number of sequential bits set to 1.

The data need not be decompressed in full to obtain the integer sequence, which allows for fast access which requires little system memory. The decoding algorithm can perform its function with only a current pointer into the compressed data and a previous integer of the sequence.

Figure 3:
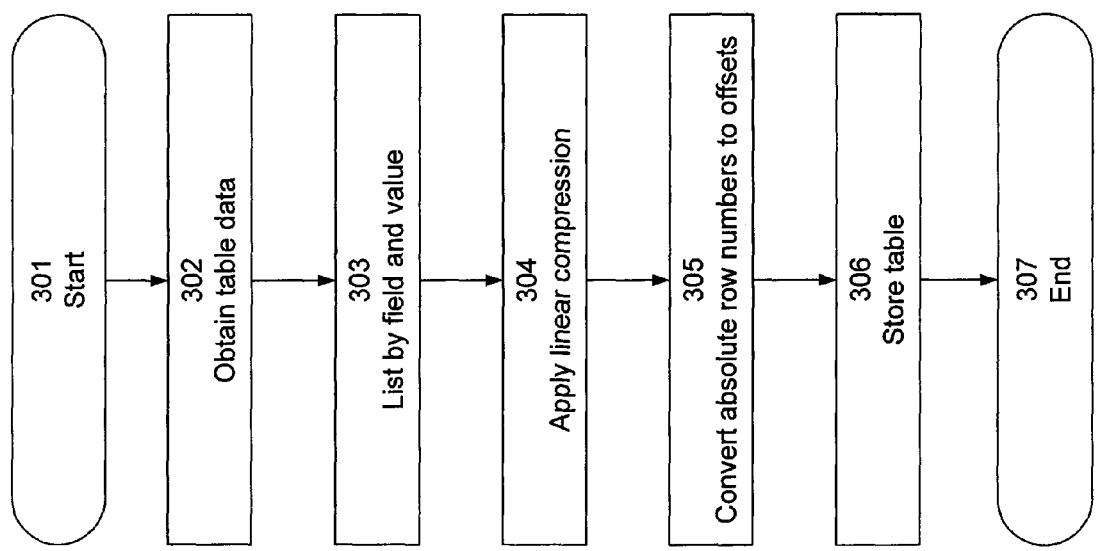
FIG. 3 is a flowchart depicting a method for generating a file according to the data format of the present invention.

Referring now to FIG. 3, there is shown a flowchart illustrating a method for generating a file according to the data format of the present invention. The flowchart is described herein in connection with an illustrative example. The raw data used for the example is simplified for illustrative purposes; however, one skilled in the art will recognize that the method and data format described herein can be applied to raw data, sampled data (for example sampled according to techniques described in the above-referenced related patent application), or any other type of data that is representable according to the techniques described herein.

A first step in the method of FIG. 3 is to obtain 302 table data. Table 1 contains a portion of the data for the example, shown in a conventional representation. The table contains three fields—state, browser, and operating system—and six rows. Each row represents an instance of collected data about a user interaction such as a web page load. In one embodiment, the values in each of the rows are 32-bit integers.

TABLE 1

| Row # | State | Browser | OS |
|-------|-------|---------|-----|
| ...   | ...   | ...     | ... |
| 101   | A     | L       | X   |
| 102   | B     | L       | Y   |
| 103   | C     | L       | X   |
| 104   | B     | L       | Y   |
| 105   | B     | M       | X   |

TABLE 1-continued

| Row # | State | Browser | OS |
|-------|-------|---------|-----|
| 106   | B     | M       | Y   |
| ...   | ...   | ...     | ... |

Next, the format of the table data is converted 303 so that the data is listed by field and value. Each field is listed. For each field, each of the values present in Table 1 is listed in ascending order. For each of the values, the rows of Table 1 that correspond to that value are listed. Continuing the above example, Table 2 contains the same data, converted to a data format for table 256 of the present invention. In one embodiment, rows are listed in ascending order.

TABLE 2

| Field   | Value | Rows              |
|---------|-------|-------------------|
| State   | A     | 101               |
|         | B     | 102, 104, 105, 106|
|         | C     | 103               |
| Browser | L     | 101, 102, 103, 104|
|         | M     | 105, 106          |
| OS      | X     | 101, 103, 105     |
|         | Y     | 102, 104, 106     |

In one embodiment, data is stored in a format substantially equivalent to that shown in Table 2: for each value of each field, a list of rows is stored. Fields and/or values that do not have any corresponding row numbers are omitted.

In another embodiment, linear compression is applied 304 to reduce the size of the data stored in the row column. If a series of rows contains the same value, only the first and last rows (or the first row and the number of rows) need be listed. Table 3 depicts the data after linear compression has been applied:

TABLE 3

| Field   | Value | Rows           |
|---------|-------|----------------|
| State   | A     | 101            |
|         | B     | 102, 104 to 106|
|         | C     | 103            |
| Browser | L     | 101 to 104     |
|         | M     | 105 to 106     |
| OS      | X     | 101, 103, 105  |
|         | Y     | 102, 104, 106  |

In one embodiment, data is stored in a format substantially equivalent to that shown in Table 3: for each value of each field, a list of rows, including ranges of rows where possible, is stored. The ranges of rows can be stored as a start and end row number (for example, "101 to 104") or as a start row number and range length (for example "101, +3") as described in more detail below. Again, fields and/or values that do not have corresponding row numbers are omitted.

In actual use, row numbers can be very high because of the large amount of data being stored. Thus, further storage efficiency is realized by converting 305 absolute row numbers to offset numbers where possible. Thus, each entry in the REZ-formatted table (after the first entry) can refer to row numbers in terms of the offset from the previous entry's row number. In another embodiment (as shown in Table 4), the first entry for each new value is given in absolute terms, and the remaining entries are given as offsets. Table 4 shows an example, using the same data as was used above:

TABLE 4

| Field | Value | Rows |
|---|---|---|
| State | A | 101 |
|  | B | 102, +2 to +4 |
|  | C | 103 |
| Browser | L | 101 to +3 |
|  | M | 105 to +1 |
| OS | X | 101, +2, +2 |
|  | Y | 102, +2, +2 |

In one embodiment, data is stored in a format substantially equivalent to that shown in Table 4. In this table, the "+" designation is shown to denote offset row numbers. One skilled in the art will recognize that this designation need not be actually stored in the table, but that any technique can be used to designate that a value is an offset rather than an absolute row number.

In another embodiment, the first entry for each new field is given in absolute terms, and the remaining entries are given as offsets based on the previous entry. The offsets can be specified based on the previous entry's start row number or end row number. Alternatively, the offsets can be specified based on the most recently seen absolute row number, ignoring all intermediate offsets.

Table 256 is then stored 306 so that it can be used later for generating reports and performing other analytic functions. In one embodiment, table 256 is stored in a binary format, so that they can be retrieved with little processing or overhead.

The REZ format described herein makes filtering easier. For example, if it is desired to remove every entry where value B appears, the specific rows containing value B can be easily identified. In addition, the file format provides a significant degree of compression, particularly when identical field values appear in consecutive rows. Accordingly, the present invention provides efficient storage and retrieval of data such as website traffic data, although one skilled in the art will recognize that the techniques described herein can be applied to other types of data as well.

In addition, the REZ format described herein can be applied to website traffic data, or other data, at any desired level of granularity. For example, individual data elements can describe visits, or visitors, or aggregated information describing website traffic, or the like.

Algorithms

As previously mentioned, the list of integers is stored as a ROWINDEX structure. The ROWINDEX structure consists of a header consisting of three 32-bit integers followed by a chunk of data of variable-length. The three 32-bit integers provide the number of integers in the list, the value of the first integer in the list, and the size of the data chunk, respectively.

Conversion Algorithm

Figure 6:
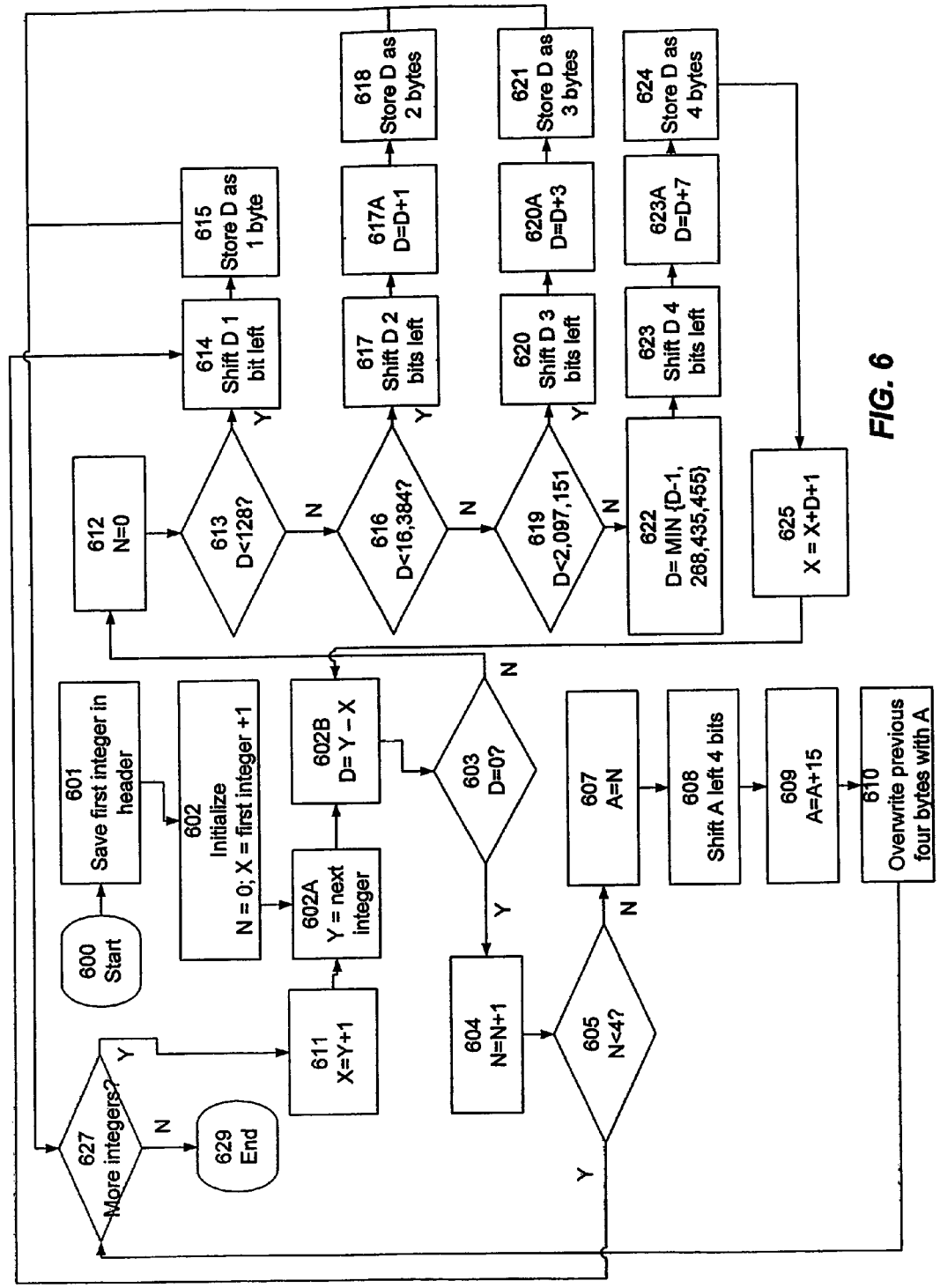
FIG. 6 is a flowchart depicting a method for converting a list of integers is to a ROWINDEX structure according to one embodiment.

Referring now to FIG. 6, there is shown a method for converting a list of integers to a ROWINDEX structure according to one embodiment. The method proceeds as follows.

The first integer is saved 601 in the ROWINDEX header. Variables are initialized 602: N=0, and X=the first integer+1. Y is assigned 602A a value equal to the next integer in the list. D is assigned 602B a value equal to the difference between X and Y.

If, in 603, D=0, then N is incremented 604. If, in 605, N is less than 4, the method proceeds to step 614. If, in 627, no more integers are available, the method ends. If, in 627, there are more integers, X is assigned 611 a value equal to Y+1 and the method returns to step 602A.

If, in 605, N is greater than or equal to 4, A is assigned 607 a value equal to N. A is shifted 608 4 bits, and 15 is added 609 to the value of A. The previous four stored bytes are overwritten 610 with A. If, in 627, no more integers are available, the method ends. If, in 627, there are more integers, X is assigned 611 a value equal to Y+1 and the method returns to step 602A.

If, in 603, D is not equal to zero, N is initialized 612 to zero. If, in 613, D is between 1 and 127 (inclusive), D is bitwise-shifted 614 by one bit to the left, and D is stored 615 as one byte. If, in 627, no more integers are available, the method ends. If, in 627, there are more integers, X is assigned 611 a value equal to Y+1 and the method returns to step 602A.

If, in 613 D is greater than or equal to 128, and in 616 D is less than 16,384, D is bitwise-shifted 617 by two bits to the left, 1 is added 617A to the value of D, and D is stored 618 as two bytes. If, in 627, no more integers are available, the method ends. If, in 627, there are more integers, X is assigned 611 a value equal to Y+1 and the method returns to step 602A.

If, in 616 D is greater than or equal to 16,384, and in 619 D is less than 2,097,151, D is bitwise-shifted 620 by three bits to the left, 3 is added 620A to the value of D, and D is stored 621 as three bytes. If, in 627, no more integers are available, the method ends. If, in 627, there are more integers, X is assigned 611 a value equal to Y+1 and the method returns to step 602A.

If, in 619 D is greater than or equal to 2,097,151, D is set to either D−1 or 268,435,455, whichever is less. D is bitwise-shifted 623 by four bits to the left, 7 is added 623A to the value of D, and D is stored 624 as four bytes. X is assigned 625 a value equal to X+D+1, and the method returns to step 602B.

Reading Algorithm

Figure 7:
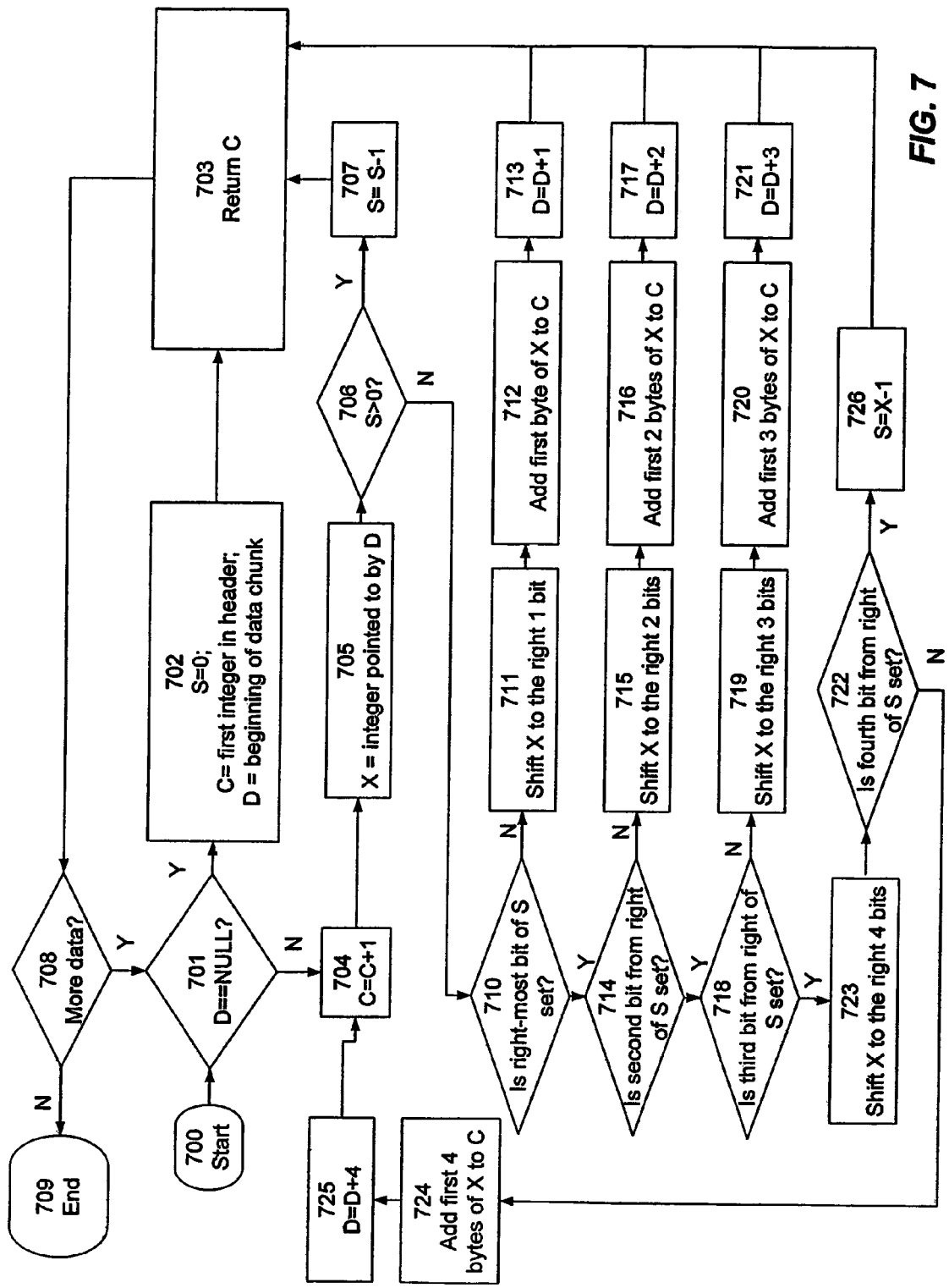
FIG. 7 is a flowchart depicting a method for reading an integer from a ROWINDEX structure according to one embodiment.

Referring now to FIG. 7, there is shown a method for reading the next integer from a ROWINDEX according to one embodiment. For this algorithm, assume that D starts as NULL. The method proceeds as follows.

If, in 701, D equals NULL, values are initialized 702 as follows: S=0, C=the value of the first integer from the ROWINDEX header, and D=a pointer to the beginning of the data chunk. The value of C is returned 703. If, in 708, there is no more data, the method ends 709. If there is more data, the method returns to step 701.

If, in 701, D does not equal NULL, C is incremented 704. X is assigned 705 a value equal to an integer pointed to by D. If, in 706, S is greater than zero, S is decremented 707 and the value of C is returned 703. If, in 708, there is no more data, the method ends 709. If there is more data, the method returns to step 701.

If, in 706, S is not greater than zero, the method proceeds to step 710. If, in 710, the right-most bit of S is not set, X is shifted 711 to the right by 1 bit and the first byte of X is added 712 to C. The value of D is increased 713 by 1 and the value of C is returned 703. If, in 708, there is no more data, the method ends 709. If there is more data, the method returns to step 701.

If, in 710, the right-most bit of S is set, the method proceeds to step 714. If, in 714, the second bit from the right of S is not set, X is shifted 715 to the right by 2 bits and the first 2 bytes of X are added 716 to C. The value of D is increased 717 by 2 and the value of C is returned 703. If, in 708, there is no more data, the method ends 709. If there is more data, the method returns to step 701.

If, in 714, the second bit from the right of S is set, the method proceeds to step 718. If, in 718, the third bit from the right of S is not set, X is shifted 719 to the right by 3 bits and the first 3 bytes of X are added 720 to C. The value of D is increased 721 by 3 and the value of C is returned 703. If, in 708, there is no more data, the method ends 709. If there is more data, the method returns to step 701.

If, in 718, the third bit from the right of S is set, X is shifted 723 to the right by 4 bits. If, in 722, the fourth bit from the right of S is not set, the first 4 bytes of X are added 724 to C. The value of D is increased 725 by 4 and the method returns to step 704. If, in 722, the fourth bit from the right of S is set, S is assigned a value equal to X−1 and the value of C is returned 703. If, in 708, there is no more data, the method ends 709. If there is more data, the method returns to step 701.

Architecture Details for Use in Website Traffic Analysis Reports System

Figure 4:
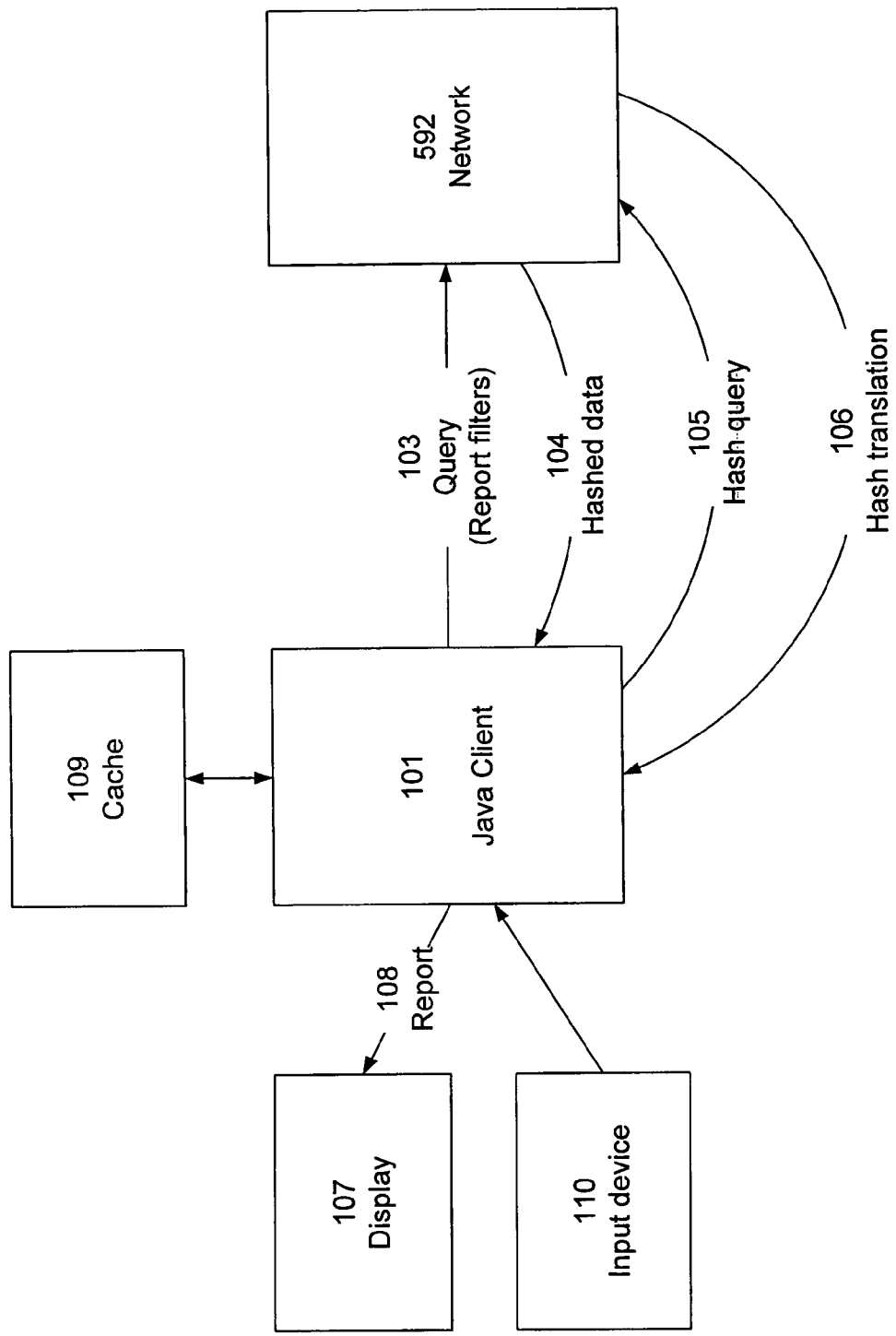
FIG. 4 is a block diagram depicting an example of an architecture for using the present invention as a data storage format in connection with generation of and interaction with website traffic analysis reports, according to one embodiment.

In one embodiment, the present invention is employed as a data storage format in connection with generation of and interaction with website traffic analysis reports. Referring now to FIG. 4, there is shown a block diagram containing details of an architecture for such an implementation. One skilled in the art will recognize that the invention can be practiced using other embodiments that differ from the examples shown.

Client 101 is a Java client that runs on a personal computer for viewing and interacting with website usage reports. Client 101 sends reports to display 107 (or other output device) for output to the user. Network 592 is a centralized network for handling and responding to client requests for data on website usage.

In one embodiment, the user interface is implemented using a known environment such as Macromedia Flex, Java, DHTML, or any combination thereof.

In one embodiment, the components shown in FIG. 4 operate as follows. When a report is to be displayed, Java client 101 sends query 103 to network 592, specifying which reports are requested, and optionally specifying one or more filters for the reports. In one embodiment, query 103 is in XML format In response to query 103, network 592 returns hashed data 104 that contains an encoded representation of the report data. For example, hashed data 104 may specify, in hash-coded terms, the number of visitors that were using a specific web browser and that visited the website within a specified time period. This hashed data 104 is received by client 101.

Client 101 stores, in local cache 109, a list of previously received and decoded hash codes, so that it can correctly interpret a hash code that it has encountered previously. In one embodiment, local cache 109 is cleared at the end of a session, so that only those codes previously received in the same session are stored in cache 109. In other embodiments, local cache 109 is implemented in a more persistent or less persistent fashion, depending on user needs.

Upon receiving hashed data 104, client 101 consults cache 109; if cache 109 contains the hash code(s) in data 104 (in other words, if client 101 has previously received data containing the same hash code), client 101 can interpret the meaning of the hash-coded data without any further communication with network 592. If hash code(s) from data 104 is/are not present in cache 109, client 101 sends hash query 105 to network 592; network 592 responds by sending hash translation 106 to client 101. Hash translation 106 provides client 101 with the meaning of hash terms (for example, specifying that hash term #299 signifies a user using Internet Explorer 6.0). In one embodiment, client 101 stores this meaning in cache 109 for future use.

Once client 101 has received sufficient data to generate a report, it sends report 108 to display 107 for output to the user. In one embodiment, if some hash meanings have not yet been received, client 101 still sends report 108, and report 108 states that certain hash terms are unknown. In another embodiment, client 101 displays an error message and/or waits until more complete hash meaning data is available.

The user can interact with the displayed report 108 via user input device 110 such as a mouse, keyboard, or the like. The user can click on areas within report 108; when the user clicks on an area that can be interpreted as a filter, client 101 generates and sends a new query 103 containing the new report filter criteria. The above process then repeats, and an updated report 108 is sent to display 107.

Figure 5:
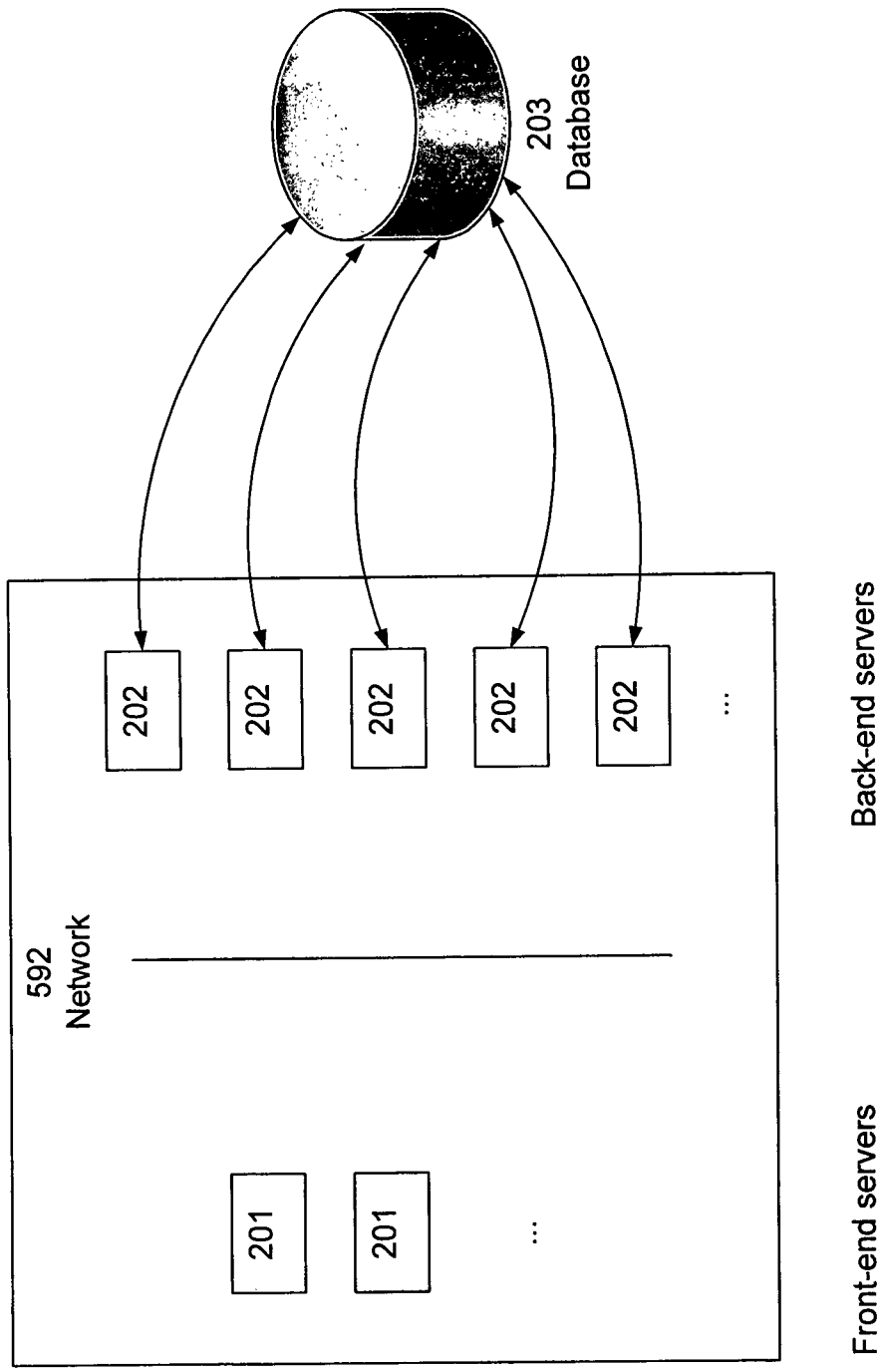
FIG. 5 is a block diagram depicting further details of an architecture for one embodiment of the present invention.

Referring now to FIG. 5, there is shown a block diagram containing further details of an architecture for network 592 according to one embodiment. Network 592 includes any number of front-end web servers 201 that receive queries 103, 105 from client 101, and any number of back-end servers 202 that obtain data from storage, analyze the obtained data, and send report data back to client 101. Back-end servers 202 send an appropriate data set to client 101 based on the filter request. For example, if a filter request specifies that the user is only interested in visitors that used a particular web browser, back-end servers 202 remove the data that does not match the specified criterion, and only forward to client 101 the data that does match. Conceptually, back-end servers 202 are applying a movable filter bar to the data set, maintaining consistency in the views into the data while changing the size of the data set according to the filter request.

Database 203 contains website traffic data, which in one embodiment is stored in a binary format stored in some storage medium such as a hard drive. In one embodiment, the website traffic data is broken up into files, or "bricks", to facilitate extraction of portions of the data. When servers 202 extract data from database 203, they are provided with specific bricks that match the criteria.

In one embodiment, when the user requests a report showing website traffic data for a specified time period, back-end servers 202 extract data from database 203 that contains web traffic logs and/or statistics. In one embodiment, servers 202 obtain data from database 203 that represents a snapshot of website traffic over a specified time period. Servers 202 then store this website traffic data in temporary local storage (such as random access memory), using for example a binary format that is encoded according to a hash algorithm so as to minimize bandwidth usage. In one embodiment, this binary format is identical to the format used in database 203, so that no file format translation need be performed when servers 202 extract data from database 203. Servers 202 and then apply filters as requested, and send the filtered data to client 101.

In one embodiment, whenever the user requests a broader date range for website traffic data, back-end servers 202 perform a new data extraction from database 203. However, when the user narrows the date range from a previously specified range, no new data extraction is performed; rather back-end servers 202 filter the previously extracted data according to the new filter parameters.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and analysis and processing techniques and mechanisms may be used, and that the present invention can be implemented using mechanisms other than those described above.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method, comprising:
  performing, by an electronic device:
    receiving a data set comprising a plurality of rows of data, each row of the plurality of rows comprising:
      one or more fields, each comprising a respective value, and
      a respective row identifier;
    identifying, for each field of the one or more fields, one or more unique values corresponding to the field; and
    for each given field of the one or more fields, and for each given identified value of the one or more unique values:
      generating a list of row identifiers, wherein each row identifier in the list of row identifiers corresponds to a row in the data set comprising the given identified value within the given field;
      identifying a contiguous range of rows within the list of row identifiers containing the unique value;
      identifying a start row number comprising a row number of a first row of the contiguous range of rows containing the unique value;
      identifying an end row number comprising a row number of a last row of the contiguous range of rows containing the unique value;
      generating a range value identifying the contiguous range of rows containing the unique value, wherein the range value comprises the start row number and the end row number and does not comprises row numbers of rows between the first row and the last row of the contiguous range of rows;
      generating one or more compressed lists, wherein for at least one of the contiguous range of rows identified, the one or more compressed lists comprise a single row representative of the contiguous range of rows, wherein the single row comprises:
        the unique value contained in the contiguous range of rows, and
        the range value identifying the contiguous range of rows, and
      wherein at least one compressed list of the one or more compressed lists comprises at least one individual row that is representative of two or more rows of the listing of the plurality of rows of data of the data set; and
      converting at least one of the start and end row numbers to an offset, wherein said converting comprises: converting at least one end row number to an offset based on a corresponding start row number; and
    generating a compressed representation of the data set, wherein the compressed representation comprises:
      for each field, an indication of each unique value of that field in the data set, and for said each unique value, an indication of the list of row identifiers having the unique value.

2. The method of claim 1, further comprising converting at least one of the start and end row numbers to an offset, wherein said converting comprises:
    converting at least one start row number to a start offset based on a previous row number; and
    converting each end row number to an end offset based on a corresponding start row number.

3. The method of claim 2, wherein converting at least one start row number to a start offset based on a previous row number comprises converting at least one start row number to a start offset based on a previous start row number.

4. The method of claim 2, wherein converting at least one start row number to a start offset based on a previous row number comprises converting at least one start row number to a start offset based on a previous end row number.

5. The method of claim 2, wherein storing the at least one compressed list of the one or more compressed lists comprises storing at least one absolute row number, and wherein converting at least one start row number to a start offset based on a previous row number comprises converting at least one start row number to a start offset based on an absolute row number.

6. The method of claim 2, wherein storing the at least one compressed list comprises storing at least one absolute row number, and wherein converting at least one start row number to a start offset based on a previous row number comprises converting at least one start row number to a start offset based on a most recently stored absolute row number.

7. The method of claim 1, wherein the data set comprises data describing website traffic.

8. The method of claim 7, wherein the data set comprises data describing at least one selected from the group consisting of visitor data, visit data, hits data, and commerce data.

9. The method of claim 1, wherein the data set comprises sampled data.

10. The method of claim 1, wherein the compressed representation of the data set represents website traffic, the method further comprising:
    receiving, from a client, a request for a website traffic report;
    responsive to the request, retrieving, from the storage device, at least a portion of at least one list of row identifiers; and
    transmitting, to the client, an encoded representation of the at least one list of row identifiers.

11. The method of claim 10, wherein encoded representation of the at least one list of row identifiers comprises hashed data, and wherein the client decodes the hashed data.

12. The method of claim 1, wherein the compressed representation of the data set represents website traffic, the method further comprising:
    receiving from a client, a request for a website traffic report, the request comprising at least one filter parameter;
    responsive to the request, retrieving, from the storage device, data from at least one list of row identifiers;
    filtering the retrieved data; and
    transmitting, to the client, an encoded representation of the filtered data.

13. The method of claim 1, wherein the compressed representation of the data set represents website traffic, the method further comprising:
    receiving a request for a website traffic report;
    responsive to the request, retrieving, from the storage device, data from at least a portion of at least one list of row identifiers;
    displaying a website traffic report based on the retrieved data;
    receiving user input specifying that a filter should be applied to the displayed report; and
    responsive to the user input, updating the displayed report to include data according to the specified filter.

14. The method of claim 13, wherein updating the displayed report to include data according to the specified filter comprises:
    identifying at least one value to be excluded based on the specified filter;
    identifying rows containing the value to be excluded; and
    updating the report to exclude the identified rows.

15. The method of claim 1, wherein the compressed representation of the data set represents website traffic, the method further comprising:
    at a front-end server, receiving, from a client, a first request for a website traffic report, the first request comprising at least one filter parameter;
    at a back-end server:
        retrieving, from the storage device, data from at least one list of row identifiers;
        removing retrieved data that does not match the filter parameter; and
        transmitting the remaining retrieved data to the front-end server;
    and wherein the front-end server transmits, to the client, an encoded representation of the remaining retrieved data.

16. The method of claim 15, further comprising:
    receiving a second request for a website traffic report;
    responsive to the second request specifying a range of data narrower than a range of data specified in the first request, filtering, at the back-end server, previously retrieved data; and
    responsive to the second request specifying a range of data broader than a range of data specified in the first request, retrieving, at the back-end server, additional data from the at least one list of row identifiers.

17. A system, comprising:
    at least one computer processor; and
    an electronic storage device comprising program instructions, wherein the program instructions are executable by the at least one processor to:
        receive data from at least one server log, the received data comprising a plurality of rows of data, each row of the plurality of rows comprising:
            one or more fields, each comprising a respective value, and
            a respective row identifier;
        identify, for each field of the one or more fields, one or more unique values corresponding to the field; and
        for each given field of the one or more fields, and for each given identified value of the one or more unique values:
            generate a list of row identifiers, wherein each row identifier in the list of row identifiers corresponds to a row in the data comprising the given identified value within the given field;
            identify a contiguous range of rows within the list of row identifiers containing the unique value;

identify a start row number comprising a row number of a first row of the contiguous range of rows containing the unique value;

identify an end row number comprising a row number of a last row of the contiguous range of rows containing the unique value;

generate a range value identifying the contiguous range of rows containing the unique value, wherein the range value comprises the start row number and the end row number and does not comprises row numbers of rows between the first row and the last row of the contiguous range of rows;

generate one or more compressed lists, wherein for at least one of the contiguous range of rows identified, the one or more compressed lists comprise a single row representative of the contiguous range of rows, wherein the single row comprises:

the unique value contained in the contiguous range of rows, and the range value identifying the contiguous range of rows, and wherein at least one compressed list of the one or more compressed lists comprises at least one individual row that is representative of two or more rows of the listing of the plurality of rows of data of the data set; and wherein the range value comprises an offset representing an end of the contiguous range of rows containing the data value; and generate a compressed representation of the data set, wherein the compressed representation comprises:

for each field, an indication of each unique value of that field in the data set, and for said each unique value, an indication of the list of row identifiers having the unique value.

18. The system of claim 17, wherein the range value comprises an offset representing a start row for a second contiguous range of rows containing the data value, the start row for the second continuous range being expressed with respect to a previous row.

19. The system of claim 17, wherein the received data describes website traffic.

20. The system of claim 19, wherein the received data describes at least one selected from the group consisting of visitor data, visit data, hits data, and commerce data.

21. The system of claim 17, wherein the received data comprises sampled data.

22. The system of claim 17, wherein the one or more compressed lists represents website traffic, the system further comprising:

a front-end server, for receiving, from a client, a request for a website traffic report; and a back-end server, for responsive to the request, retrieving, from the storage device, at least a portion of the one or more compressed lists and providing the retrieved portion to the front-end server;

wherein the front-end server transmits, to the client, an encoded representation of at least a portion of the one or more compressed lists.

23. The system of claim 22, wherein an encoded representation of the at least a portion of the one or more compressed lists comprises hashed data, and wherein the client decodes the hashed data.

24. The system of claim 17, wherein the one or more compressed lists represents website traffic, the system further comprising:

a front-end server, for receiving, from a client, a request for a website traffic report, the request comprising at least one filter parameter; and a back-end server, for:

responsive to the request, retrieving the one or more compressed lists from the storage device;

filtering the retrieved data; and providing the filtered data to the front-end server;

wherein the front-end server transmits, to the client, an encoded representation of the filtered data.

25. The system of claim 17, wherein the one or more compressed lists represents website traffic, the system further comprising:

a front-end server, for receiving, from a client, a request for a website traffic report;

a back-end server, for, responsive to the request, retrieving the one or more compressed lists from the storage device; and a display, for displaying a website traffic report based on the retrieved data; and a user input device, for receiving user input specifying that a filter should be applied to the displayed report;

and wherein, responsive to the user input, the display updates the displayed report to include data according to the specified filter.

26. The system of claim 25, wherein, responsive to the user input, the back-end server applies the filter by:

identifying at least one value to be excluded based on the specified filter; and identifying rows containing the value to be excluded.

27. The system of claim 17, wherein the one or more compressed lists represents website traffic, the method further comprising:

at a front-end server, receiving, from a client, a first request for a website traffic report, the first request comprising at least one filter parameter;

at a back-end server:

retrieving compressed data from the storage device; and removing retrieved data that does not match the filter parameter; and transmitting the remaining retrieved data to the front-end server;

and wherein the front-end server transmits, to the client, an encoded representation of the remaining retrieved data.

28. The system of claim 27, further comprising:

a front-end server, for receiving a second request for a website traffic report;

a back-end server, for:

responsive to the second request specifying a range of data narrower than a range of data specified in the first request, filtering previously retrieved data; and responsive to the second request specifying a range of data broader than a range of data specified in the first request, retrieving additional compressed data from the one or more compressed lists.

29. A method, comprising:

in an electronic device, retrieving, for at least one data value, a representation of a list from a compressed representation of a data set, wherein the compressed representation of the data set comprises the at least one data value, wherein the data set comprises a plurality of rows of data, each row of the plurality of rows comprising:

one or more fields, each comprising a respective value, and a respective row identifier, and wherein the compressed representation of the data set comprises:
  for each field of the data set, an indication of a unique value of that field in the data set, and
  for each unique value of that field, an indication of a list of row identifiers having the unique value;
in the electronic device, determining, from the representation of the list, at least one row identifier, wherein the row identifier identifies a row in a table comprising the at least one data value;
identifying a contiguous range of rows within the list of row identifiers containing the at least one data value;
identifying a start row number comprising a row number of a first row of the contiguous range of rows containing the at least one data value;
identifying an end row number comprising a row number of a last row of the contiguous range of rows containing the at least one data value, wherein the end row number is represented by an offset;
generating a range value identifying the contiguous range of rows containing the at least one data value, wherein the range value comprises the start row number and the end row number and does not comprises row numbers of rows between the first row and the last row of the contiguous range of rows;
generating one or more compressed lists, wherein for at least one of the contiguous range of rows identified, the one or more compressed lists comprise a single row representative of the contiguous range of rows, wherein the single row comprises:
  the at least one data value contained in the contiguous range of rows, and
  the range value identifying the contiguous range of rows, and
wherein at least one compressed list of the one or more compressed lists comprises at least one individual row that is representative of two or more rows of the listing of the plurality of rows of data of the data set; and
determining a set of at least one row containing the same data value comprising reading a start row number and an offset for at least one contiguous range of rows containing the data value; and
converting the start row number and offset read to a list of row numbers; and
at an output device, generating output based on the at least one row identifier.

30. The method of claim 29, further comprising:
generating output based on the determined set of at least one row comprises generating a website traffic report, wherein the data describes website traffic data.

31. The method of claim 30, wherein the data describes at least one selected from the group consisting of visitor data, visit data, hits data, and commerce data.

32. A non-transitory computer program product, comprising:
  a computer-readable storage medium; and
  computer program code, encoded on the computer-readable storage medium, programmatically configured to cause a processor to perform the steps of:
    receiving a data set comprising a plurality of rows of data, each row of the plurality of rows comprising:
      one or more fields, each comprising a respective value, and
      a respective row identifier;
    identifying, for each field of the one or more fields, one or more unique values corresponding to the field; and
    for each given field of the one or more fields, and for each given identified value of the one or more unique values:
      generating a list of row identifiers, wherein each row identifier in the list of row identifiers corresponds to a row in the data set comprising the given identified value within the given field;
      identifying a contiguous range of rows within the list of row identifiers containing the unique value;
      identifying a start row number comprising a row number of a first row of the contiguous range of rows containing the unique value;
      identifying an end row number comprising a row number of a last row of the contiguous range of rows containing the unique value;
      generating a range value identifying the contiguous range of rows containing the unique value, wherein the range value comprises the start row number and the end row number and does not comprises row numbers of rows between the first row and the last row of the contiguous range of rows; and
      generating one or more compressed lists, wherein for at least one of the contiguous range of rows identified, the one or more compressed lists comprise a single row representative of the contiguous range of rows, wherein the single row comprises:
        the unique value contained in the contiguous range of rows, and
        the range value identifying the contiguous range of rows, and
      wherein at least one compressed list of the one or more compressed lists comprises at least one individual row that is representative of two or more rows of the listing of the plurality of rows of data of the data set; and
    generating a compressed representation of the data set, wherein the compressed representation comprises:
      for each field, an indication of each unique value of that field in the data set, and
      for said each unique value, an indication of the list of row identifiers having the unique value.

33. The computer program product of claim 32, wherein the at least one compressed list represents website traffic, the computer program product further comprising computer program code for:
  receiving, from a client, a request for a website traffic report;
  responsive to the request, retrieving, from the storage device, at least a portion of the at least one compressed list; and
  transmitting, to the client, an encoded representation of the at least one compressed list.

34. The computer program product of claim 33, wherein the encoded representation of the at least one compressed list comprises hashed data, and wherein the client decodes the hashed data.

35. The computer program product of claim 32, wherein the at least one compressed list represents website traffic, the computer program product further comprising computer program code for:
  receiving, from a client, a request for a website traffic report, the request comprising at least one filter parameter;
  responsive to the request, retrieving, from the storage device, data from the at least one compressed list;
  filtering the retrieved data; and transmitting, to the client, an encoded representation of the filtered data.

36. The computer program product of claim 32, wherein the at least one compressed list represents website traffic, the computer program product further comprising computer program code for:
receiving a request for a website traffic report;
responsive to the request, retrieving, from the storage device, data from at least a portion of at least one compressed list of the one or more compressed lists;
displaying a website traffic report based on the retrieved data;
receiving user input specifying that a filter should be applied to the displayed report; and
responsive to the user input, updating the displayed report to include data according to the specified filter.

37. The computer program product of claim 36, wherein the computer program code for updating the displayed report to include data according to the specified filter comprises computer program code for:
identifying at least one value to be excluded based on the specified filter;
identifying rows containing the value to be excluded; and
updating the report to exclude the identified rows.

38. The computer program product of claim 32, wherein the stored at least one compressed list of the one or more compressed lists represents website traffic, the computer program product further comprising computer program code for:
at a front-end server, receiving, from a client, a first request for a website traffic report, the first request comprising at least one filter parameter;
at a back-end server:
retrieving, from the storage device, data from the at least one compressed list of the one or more compressed lists; and
removing retrieved data that does not match the filter parameter; and
transmitting the remaining retrieved data to the front-end server;
and wherein the front-end server transmits, to the client, an encoded representation of the remaining retrieved data.

39. The computer program product of claim 38, further comprising computer program code for:
receiving a second request for a website traffic report;
responsive to the second request specifying a range of data narrower than a range of data specified in the first request, filtering, at the back-end server, previously retrieved data; and
responsive to the second request specifying a range of data broader than a range of data specified in the first request, retrieving, at the back-end server, additional data from at least one compressed list of the one or more compressed lists.

* * * * *

UNITED STATES PATENT AND TRADEMARK OFFICE
CERTIFICATE OF CORRECTION

PATENT NO. : 8,538,969 B2  
APPLICATION NO. : 11/274560  
DATED : September 17, 2013  
INVENTOR(S) : Michael Paul Bailey Page 1 of 1

It is certified that error appears in the above-identified patent and that said Letters Patent is hereby corrected as shown below:

In the Claims

Column 17, Claim 32, Line 55:

Delete the words "non-transitory"

Column 17, Claim 32, Line 57:

Delete the words "a computer-readable storage medium; and"

Insert the words --a non-transitory computer-readable storage medium; and--

Signed and Sealed this  
Eighth Day of April, 2014

Michelle K. Lee  
*Deputy Director of the United States Patent and Trademark Office*